Dec. 28, 1965  H. W. CHRISTENSON  3,225,627
TORQUE TRANSMITTING MECHANISM
Original Filed Dec. 4, 1953  3 Sheets-Sheet 1

INVENTOR.
HOWARD W. CHRISTENSON
BY
ATTORNEYS.

INVENTOR.
HOWARD W. CHRISTENSON

INVENTOR.
HOWARD W. CHRISTENSON
BY
ATTORNEYS.

United States Patent Office 3,225,627
Patented Dec. 28, 1965

3,225,627
TORQUE TRANSMITTING MECHANISM
Howard W. Christenson, Indianapolis, Ind., assignor to General Motors Corporation, Detroit, Mich., a corporation of Delaware
Original application Dec. 4, 1953, Ser. No. 396,272, now Patent No. 3,073,179, dated Jan. 15, 1963. Divided and this application July 31, 1962, Ser. No. 213,712
4 Claims. (Cl. 74—769)

This application is a division of the applicant's prior application Serial No. 396,272, filed December 4, 1953, now Patent No. 3,073,179. This invention relates to transmissions and more particularly to transmission gearing.

In planetary gear transmissions it is advantageous to float the ring gear on the planetary pinions so that the ring gear may rotate about the center of the pitch circle defined by the planetary pinions. This arrangement eliminates stress concentration in the gearing and particularly the ring gear, pinions and the mounting thereof due to inaccuracies in the gears and their mounting. The ring gear is provided with an integral brake disc which increases the rigidity of the ring gear. The brake disc on the ring gear extends between the reaction plate and the pressure plate of the brake mechanism located on the housing. The pressure plate and the reaction plate are maintained when the brake is disengaged with a small clearance between them and the brake plate to prevent any substantial movement of the brake plate and ring gear. The pressure plate is moved by a suitable motor to engage and hold the brake plate against the reaction plate to hold the ring gear against rotation to provide reaction for the planetary gearing.

An object of the invention is to provide in planetary gearing having a floating ring gear with a brake plate rigidly secured to the ring gear providing an annulus extending radially from the ring gear and located between a reaction plate and a pressure plate of a brake mechanism operatively located on a support or housing to axially locate the ring gear of the planetary gear unit.

Other objects will become apparent as the detailed description is considered in connection with the accompanying drawings.

Figure 1:
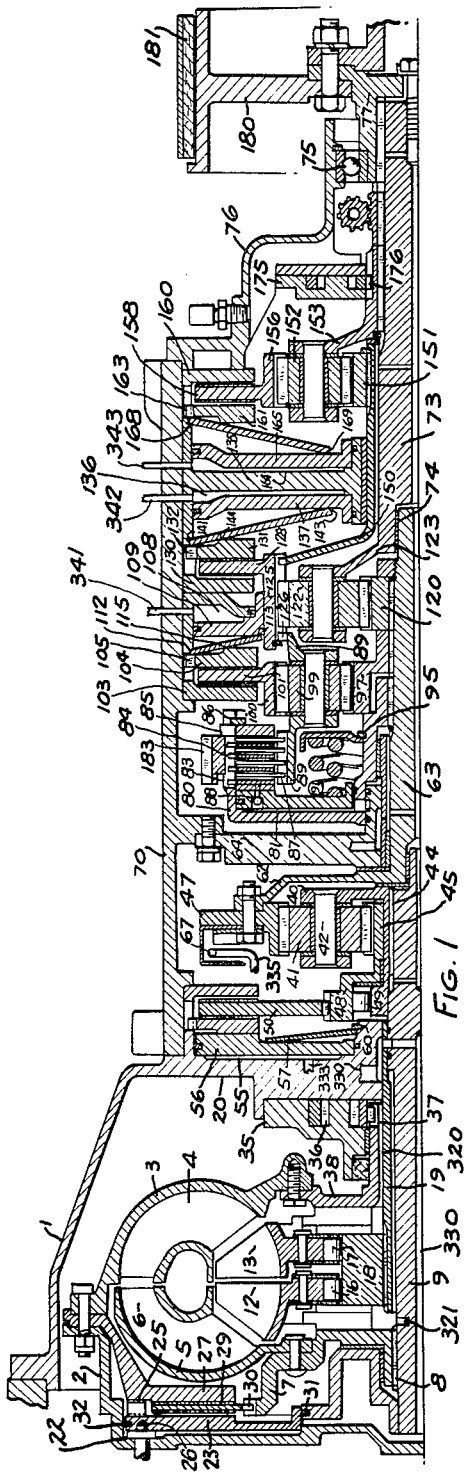
FIGURE 1 is a cross sectional view showing a transmission constructed in accordance with the invention.
Figure 2:
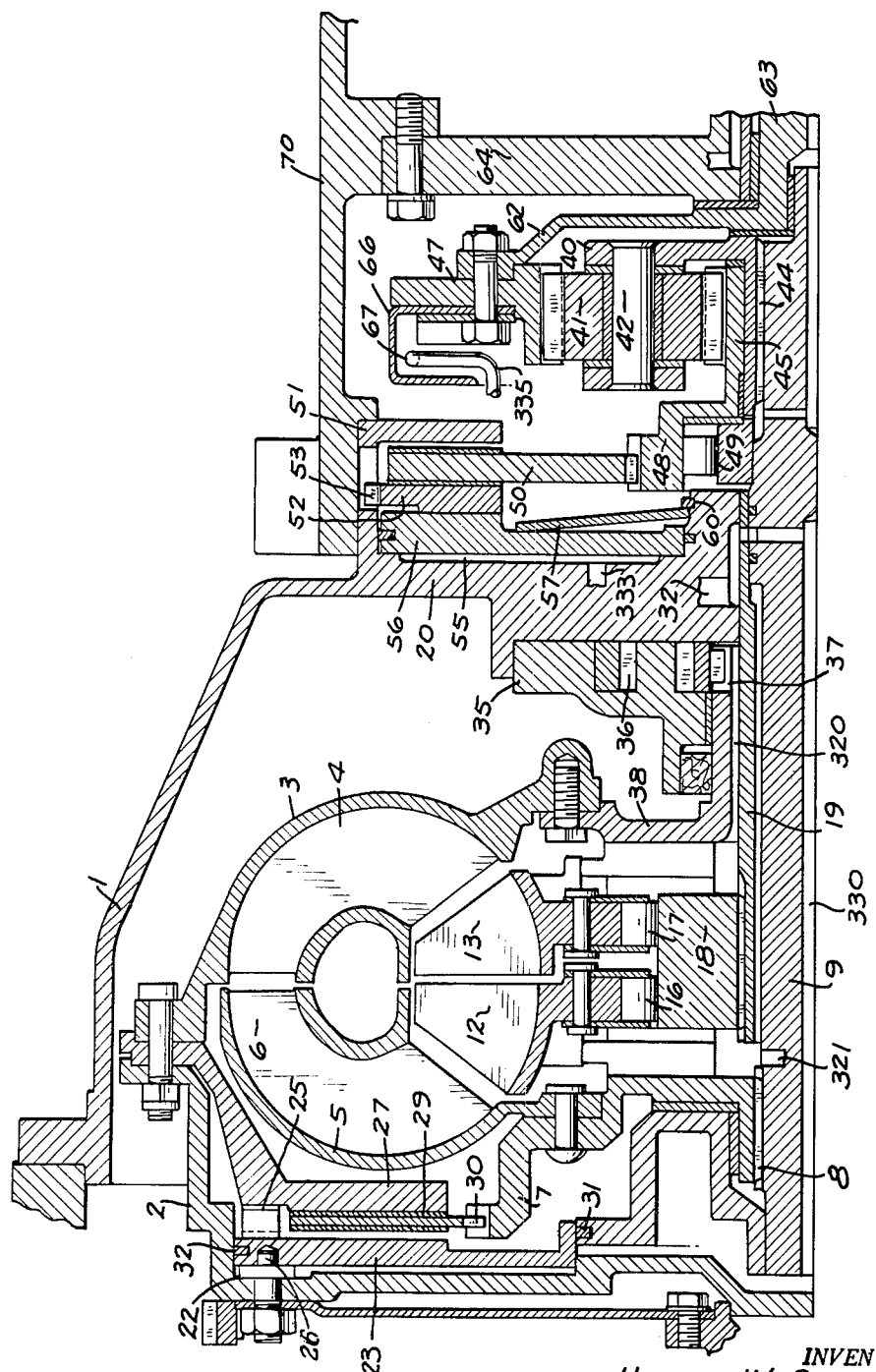
FIGURE 2 is an enlarged cross sectional view illustrating the forward section of the transmission.
Figure 3:
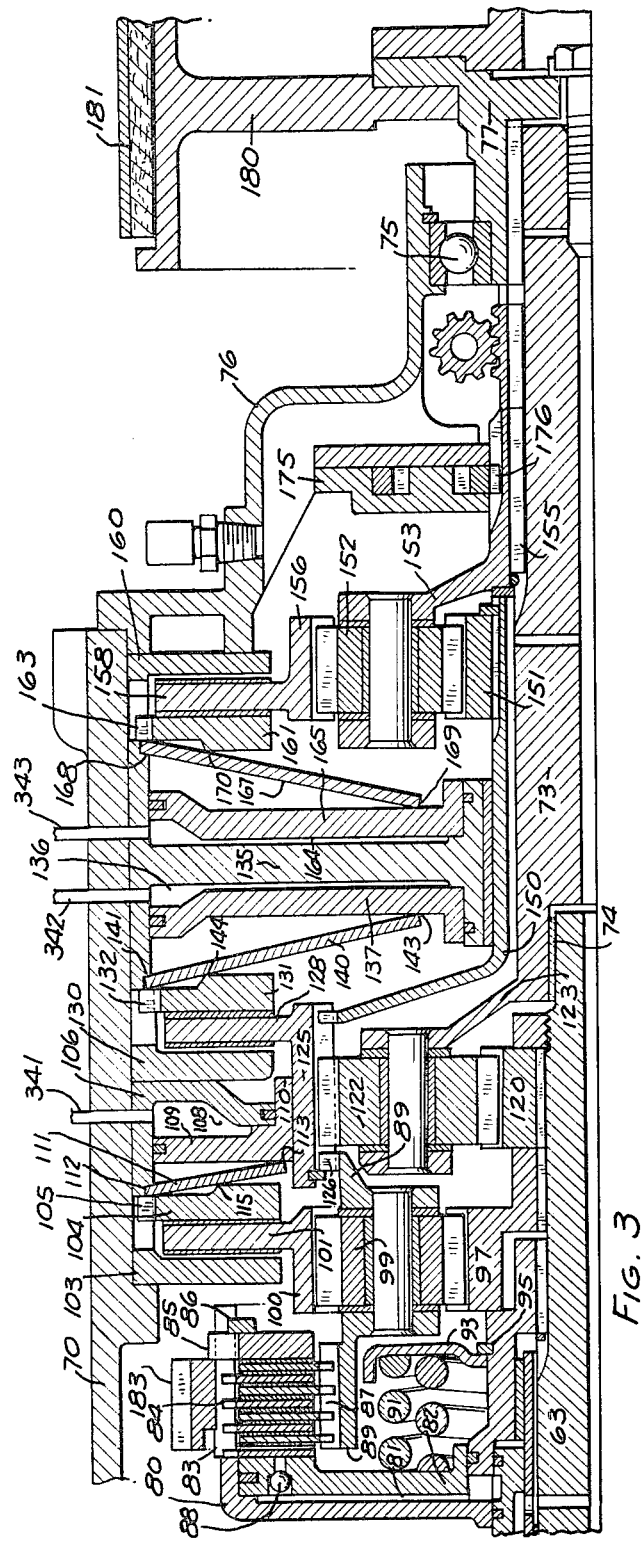
FIGURE 3 is an enlarged cross sectional view illustrating the gear portion of the transmission.

A housing 1 is arranged to be attached to an engine and a member 2 is to be attached to the engine crank shaft and it constitutes the fly wheel or part of the fly wheel mass. Secured to the member 2 is a shell 3 with blades or vanes 4 and it constitutes the pump or impeller of a torque converter. The rotor or driven member of the converter is shown at 5 having blades 6, and the member 5 is secured to a hub member 7 splined or otherwise secured as at 8 to a shaft 9. The torque converter shown has two stators with blades 12 and 13 each associated, by means of an overrunning or one-way brake 16 and 17, with a hub element 18 fixed to a stator or fixed sleeve 19 fastened to the rear wall or partition 20 of the housing 1. This torque converter, as shown is one of a known-type, and the impeller, rotor and stators define a torus chamber in which the blades are located. As well known by those skilled in the art, rotation of the impeller transmits torque to the rotor incident to the hydraulic medium impinging upon the blades. The blades of the stators so change the direction of the flow of the oil in the torus chamber, that within the range of the torque converter, the ratio infinitely varies until such time as the rotor comes up to the speed of the impeller less, of course, the usual amount of slippage in the device.

The fly wheel member 2 is shaped to provide a cylinder 22 which is of annular form and in the cylinder is an annular piston or head 23 slidably keyed to the member 2 as at 26 with a return spring at 25. A clutch back-up plate 27 is secured to the member 2, and lying between the piston 23 and the plate 27 is the driven disc 29 of a clutch, its inner peripheral edge being mounted as at 30 on the hub member 7. It will be appreciated that when hydraulic medium under pressure is introduced into the cylinder 22, the piston 23, which is likewise a clutch plate, is shifted and the driven member 29 is frictionally engaged between the clutch plate 23 and back up plate 27 so that torque is transmitted directly to the member 7 and the torque converter, so to speak, is cut out of the system and transmits no torque. Suitable oil seals 31 and 32 are provided.

Mounted on the partition 20 is a pump 35 with pump elements 36 therein driven by tangs 37 on a member 38 attached to the impeller 3. Thus the pump 35 is driven by the engine through the torque converter housing.

The shaft 9 extends through the partition 20 and next adjoining the torque converter is a two speed gear set which may be conveniently termed a splitter gear unit or overdrive unit. This gear construction includes a planetary gear set with a carrier 40 for a plurality of pinion gears 41, each journalled on a pin 42, the carrier 40 being splined or otherwise secured to the shaft 9 as at 44. There is a sun gear 45 with external teeth meshing with the teeth of the pinions and a ring gear 47 with internal teeth meshing with the teeth of the pinions. The sun gear is formed with a portion, integral therewith or otherwise, of larger diameter as shown at 48, and between the internal surface of the portion 48 and shaft 9 is an overrunning or one-way clutch generally illustrated at 49. Overrunning clutches of this type are well known. The member 48 is connected to one member 50 of a friction control device. This member 50 is in the form of a single plate and it lies between a fixed reaction plate 51 and a shiftable plate or ring 52. The member 52 is slidably keyed to the member 51 as at 53.

The partition 20 is formed with a cylinder 55 in which is a piston 56 of annular form shiftable for engaging and shifting the member 52. The piston 56 situated in the cylinder with suitable seals, as shown, directly engages the member 52. Spring means in the form of a Belleville washer 57 has its inner peripheral edge mounted upon an extension of the partition 20 and held by a snap ring 60 while its outer peripheral edge engages the piston 56 to hold it normally shifted to the left as FIG. 1 is viewed. It will be appreciated that if the piston 56 is shifted to the right against the action of the spring 57, that the member 50 is frictionally engaged between members 52 and 51. This construction constitutes a friction engaging means. However, when it is fully engaged, the plate 50 is held stationary, by the gripping members 51 and 52. This friction engaging arrangement allows the rotating member 48 to seek its own running center preserving good polar alignment of the gear train.

The ring gear 47 is connected to a torque transmitting member 62 mounted on or constituting an integral part of a shaft 63 journalled in a dividing partition or support member 64. Mounted on the ring gear member is an annular channel 66 in which is disposed a stationary Pitot tube 67 connected to a line or conduit for hydraulic control means. The channel is a collector adapted to have a quantity of oil therein which forms a rotating ring of oil as the ring gear rotates in operation, and the open end of the Pitot tube faces toward the on-coming oil and thus is subjected to the pressure.

The mechanical operation of this overdrive gear unit is as follows:

Basically, the unit is for the purpose of transmitting torque from the shaft 9 to the shaft 63. If the brake member 50 is released and shaft 9 is rotated, the shaft 63, which is the torque output member, offers resistance. The result is that the carrier 40 will turn in a forward direction and the resistance offered by the ring gear 47 tends to turn the pinions on their axes, which in turn tend to rotate the sun gear in a direction which is the same as that of the carrier. The overrunning clutch 49 engages and prevents the sun gear from rotating faster than the carrier and shaft 9. Therefore, the shaft 9, the sun gear 45, the pinions 41 and the ring gear 47 become locked up as a unit and torque may be transmitted from the shaft 9 to the shaft 63 at a 1:1 ratio.

On the other hand, let it be assumed that hydraulic medium is introduced into the cylinder 55 and the control brake becomes engaged thus bringing the sun gear to zero r.p.m. which, of course, is possible as the overrunning clutch permits of this action. Rotation of the carrier 40 causes the pinions 41 to rotate on their axes as they revolve about the sun gear with the result that the ring gear 47 is rotated at a speed faster than that of the shaft 9. Thus, it is that this splitter gear is capable of transmitting torque in a locked up condition where the ratio between the shaft 9 and the shaft 63 is 1:1, and in an overdriving relationship wherein the shaft 63 is rotated faster than the rotation of the shaft 9. When the overdrive unit is operating at 1:1 ratio, at which time the shaft 9 and the sun gear 45 are coupled together by the one way clutch 49, a free wheeling condition exists in the sense the vehicle may overrun the engine. However, an automatic shift control keeps the unit in overdrive unless the engine throttle is held open, so in service no free wheeling occurs in normal operation.

Rearwardly of the overdrive or splitter gear unit is a housing 70 which contains the range change gearing and it will be seen that the shaft 63 projects into this housing. The shaft 63 is the input member of this unit while shaft 73 is the output member. Shaft 73 is piloted on the shaft 63 as at 74 and it is mounted in a bearing 75 carried in a housing end piece 76. The inner race of the bearing may actually seat upon a hub 77 mounted on the end of the shaft 73.

Interposed between the member 63 and 73 are planetary gear sets and brakes and a clutch for effecting various driving ratios. There is a member 80 with a hub portion splined to the shaft 63 and which is formed to provide a cylinder 81 in wihch is located a piston 82. The member 80 has a peripheral flange 83 upon which is mounted a plurality of driving clutch plates 84. A back-up plate 85 is held by a ring 86 and interleaved with the clutch plates 84 are driven clutch plates 87, mounted on a carrier member 89 of a planetary gear set. One or more coil springs 91 hold the clutch plates separated, the spring or springs acting upon the piston 82 and reacting on a member 93 positioned on the hub of the member 80 by a ring 95. It will be understood that if hydraulic medium is delivered into the cylinder 81 under pressure, the springs 91 are compressed and the clutch is engaged. The piston 82 is advantageously provided with a port formed with a seat for a ball 88 which structure provides a ball bleed valve. This ball bleed valve holds oil under pressure when delivered into the cylinder 81 but permits readily of the escape of oil or hydraulic medium from cylinder 81 when it is not pressurized. Thus, for example, when the cylinder 81 is not pressurized, any oil trapped in the cylinder 81 may escape through the ball bleed valve. Centrifugal force tends to unseat the ball since it rests on a cone seat, however line control pressure is adequate to keep the ball seated when it is intended that the clutch be applied.

The sun gear 97 of the planetary gear set is splined to the shaft 63 and its teeth mesh with those of pinions 99, each mounted on a pin supported by the carrier 89. The pins are supported at opposite ends and while the carrier is comprised of two elements, the carrier elements function as one structural piece and, therefore, reference character 89 is applied to both sides of the carrier. There is a ring gear 100, the teeth of which mesh with those of pinions 99 and this ring gear is a controlling element. For this purpose the ring gear has a disc-like outer portion 101 which constitutes a brake member. The portion 101 lies between a fixed reaction member 103 and a pressure plate 104 slidably and non-rotatably connected to the reaction member 103 as at 105. A cup-shaped member 106, mounted fixedly relative to the housing 70, forms a cylinder 108 in which is located a piston 109 with suitable seals as shown. As shown the piston has a hub portion 110 which extends through the inner peripheral part of the cylinder 106 and a seal is shown at this location.

Introduction of hydraulic medium into the cylinder 108 serves to shift the piston 109 to the left for the purpose of shifting the pressure plate 104 to cause the member 101 to be engaged between the pressure plate and the reaction member 103. For this purpose, there is an actuating and cushioning spring 111 positioned between the piston and the pressure plate and this is in the form of a coned washer or ring of suitable metal such as steel having elastic characteristics and such a spring is generally known as a Belleville spring. The outer peripheral portion is seated as at 112 in a fixed seat such as a portion of the member 106, while its inner peripheral portion is engaged by the piston, as shown, at 113. The intermediate part of the Belleville spring engages the pressure plate as at 115. Thus, if the piston shifts to the left the spring acts as a lever of the second order and is preferably arranged, as shown, to increase the mechanical advantage of the piston. The spring thus serves to cushion the engaging action of the brake and also serves as a retracting spring to retract the piston into its cylinder when the pressure of the hydraulic medium is released. However, the primary function of the member 111 is to increase the application of thrust force to the plate 104.

Another sun gear 120 is splined to the shaft 63 and it is associated with a plurality of pinions 122. These pinions are mounted in a carrier constituted by a flange 123 on the output shaft 73. A ring-gear 125 has internal teeth meshing with those of the pinions and this ring gear is non-rotatably connected to the carrier 89, as indicated at 126. The ring gear 125 has an outer peripheral portion of disc form 128 which lies between a reaction member 130 and a pressure plate 131 slidably keyed to the reaction member 130 as at 132. A member 135 forms a cylinder 136 for a piston 137. A Belleville spring 140 has its outer peripheral edge seated as at 141 in the outer portion of member 135 and its inner edge positioned for engagement with the piston as at 143 while the Belleville spring engages the pressure plate 131 as at 144. Upon introduction of hydraulic medium into cylinder 136 the piston shifts to the left and through the Belleville washer shifts the pressure plate 131 to the left to thereby frictionally engage the portion 128 of ring gear 125 between the pressure plate and the reaction member 130. The Belleville spring cushions the engaging action, serves to retract the piston and provides leverage advantage. It will be noted that the spring 140 provides a greater mechanical advantage than the spring 111; this is a preferred arrangement because the control of the member 128 has to do with the low speed gearing and the additional leverage advantage is desirable to take care of the high torques encountered.

Non-rotatably connected to the ring gear 125 is a sleeve 150 which extends through the member 135 and has a sun gear 151 mounted thereon. Associated with this sun gear are a plurality of pinions 152 supported by a carrier 153 splined or keyed to the shaft 73 as at 155. Associated with the pinions 152 is a ring gear 156 with a disc-like outer peripheral portion 158. The portion 158 lies between a reaction member 160 and a pressure plate 161 which is slidably keyed to the reaction member as at 163. The member 135 also forms a cylinder 164 for a piston 165 and between the piston and the pressure plates 161 is a Belleville washer or spring 167. The outer edge of the Belleville spring is seated or fulcrumed as at 168, the inner edge arranged to engage the piston as at 169 and an intermediate part of the spring is arranged to engage the pressure plate 161 as at 170. Shift of the piston 165 to the right incident to introduction of hydraulic medium into the cylinder 164 causes the spring 167 to shift the pressure plate 161 to the right to thus engage the brake member 158 between the pressure plate 161 and the reaction member 160. When hydraulic pressure is relieved from the cylinder 164 the spring 167 serves to retract the piston.

There is a pump generally indicated at 175 having internal operating pump parts, one of which is keyed or splined as at 176 to the hub of the member 153. This pump, as will be observed is operated by the output member 73.

Mounted on the hub 77 as by means of bolts to which a final drive may be connected, is a brake member 180 arranged to be frictionally engaged by a brake band or shoe 181. The provision of this brake structure, however, is optional. A gear 183 with external teeth, may be mounted on the member 83 to thus provide a power take-off.

It is believed to be expedient at this time to give a general description of the operation of the mechanism without reference to the control. It has already been set forth how the overdrive unit which involves the brake member 50 and the associated planetary gear set may transmit torque in direct drive, that is, at a 1:1 ratio and can transmit torque in overdrive manner. The multiple disc clutch involving the plates 84 and 87 is termed the "high clutch" and when it is engaged torque is transmitted from shaft 63 to output member 73 at a 1:1 ratio. The brakes, using the term "brake" because the controlled member is engaged with fixed element, or grounded, so to speak, are labeled as shown as intermediate, low and reverse, meaning an intermediate gear reduction, a low gear reduction and a reverse drive. When the high clutch is engaged, the sun gear 97 and the carrier 89 are locked together as a unit. Since sun gear 120 is mounted on the shaft 63 and since the carrier 89 is keyed or splined to the ring gear 125, the sun gear 120 and the ring gear 125 are locked together as a unit, so all these parts rotate in unison and the pinions 122 cannot turn on their axes and therefore torque is transmitted at a 1:1 ratio from shaft 63 to the output member 73. At this time the intermediate, low and reverse brakes are released.

If the intermediate brake is engaged the ring gear 100 is held stationary. The carrier 89 revolves in the same direction of rotation as the sun gear 97 but at a lower speed because the pinions 99 in turning on their respective axes, revolve within the ring gear 100. This slower movement is imparted to the ring gear 125. Sun gear 120 is acting upon the pinions 122 and the pinions 122 in turning on their axes revolve about the internal gear 125 thus transmitting torque to the carrier 123 and output shaft 73. The speed of rotation of the carrier 123 is thus greater than that of the rotation of the carrier 89 but less than the speed of rotation of the shaft 63 and sun gear 120. At this time, the high clutch and the low and reverse brakes are released.

When the low brake is engaged the ring gear 125 is held stationary and rotation of the sun gear 120 causes the pinions 122 to rotate on their respective axes and revolve about the stationary ring gear 125 thus transmitting torque to the carrier 123 and output shaft 73 at the low speed ratio. At this time the high clutch and the intermediate and reverse brakes are released.

When the reverse brake is engaged the ring gear 156 is held stationary. It is to be remembered that reaction is offered by the carrier 153. At this time with the high clutch and intermediate and low brakes released, the sun gear 120 acts on the pinions 122 and thus the ring gear 125 is driven in the reverse direction. The ring gear 125, as above described, is connected through the sleeve 150 to the sun gear 151 and thus sun gear 151 is driven in the reverse direction. Since ring gear 156 is held stationary the reverse rotation of the sun gear 151 causes the pinions 152 in rotating on their respective axes, to revolve about the stationary gear 156 in the reverse direction. And thus torque is transmitted in reverse to the carrier 153 which is splined to the output shaft 73.

Thus it will be observed that the range change section of the transmission, in addition to reverse, has a high range, an intermediate range and a low range and multiplying this by the two speed ratios obtained in the splitter gear unit there is a total of six ratios. These are mechanical ratios. In addition to this, the fluid torque converter provides for further torque variation. It is to be appreciated that the specific ratios may be varied but in order to clarify the situation, one example is given herewith. This example also shows the manual selection of high, intermediate, low and reverse in the range change section, and the automatic ratio change in the splitter gear section. This example also shows a torque converter with a maximum torque ratio of 3.6 which is also subject to change or variation.

| Manual Selection Range Change Unit | Automatic Selection Splitter Gear Unit | Mechanical Ratio | Maximum at Stall |
|---|---|---|---|
| High | Overdrive | .72:1 | 2.6:1 |
|  | Direct | 1.00:1 | 3.6:1 |
| Int | Overdrive | 1.36:1 | 6.8:1 |
|  | Direct | 1.89:1 |  |
| Low | Overdrive | 2.56:1 | 12.8:1 |
|  | Direct | 3.56:1 |  |
| Rev | Overdrive | 2.80:1 | 14.0:1 |
|  | Direct | 3.89:1 |  |

It will be noted that the controlling element of the planetary gear sets for intermediate, low and reverse, and also in the overdrive gear unit, are all elements to be grounded; that is to say, to be frictionally engaged, brought to and held at zero r.p.m. when they are functioning as controlling elements. In this way the structure is simplified in that rotating seals are eliminated. In other words, for example, a conduit for hydraulic medium leading into the cylinder 108 needs no rotating seal as the conduit connection may be made directly with the stationary cylinder.

The structure is capable of operating over a long period of time without adjustment inasmuch as all wear on the brake and clutch members is adequately taken up by movement of the operating pistons in their cylinders. Preferably, all friction faces are metal, there being suitable metal for friction purposes applied to the faces of the pressure plates and reaction members. This could be reversed in that the facing metal may be placed upon the ground members of the planetary gear sets. Moreover, all hydraulic loads are purely axial and all mechanical loads are pure torsion giving a maximum capacity with a minimum distortion or alignment problems.

Moreover, it will be observed that the control members of the planetary gear sets for intermediate, low and reverse are all ring gear members and merely float on their several pinions. The brake plates 101, 128 and 158 are advantageously integrally formed with their respective ring gears and extend between the brake reaction plate and brake pressure plate to axially locate the ring gear. These brakes, as well as the one in the splitter gear unit, are of the single plate variety which reduces spin friction and the single plate resists heat checks and distortions better than multiple plate designs.

The above described preferred embodiment is illustrative of the invention which may be modified within the scope of the appended claims.

I claim:
1. In a transmission, a substantially cylindrical housing having a central axis; a drive member and driven member located coaxially on said axis in said housing; a planetary gear unit connecting said drive and driven members having gearing and first and second ratio establishing means respectively operative to establish a first ratio of low torque and to establish a second ratio of high torque; said gearing of said gear unit having a substantially cylindrical coaxial envelope, said first and second ratio establishing means including respectively first and second annular friction disc means located concentrically between said housing and said gearing; first and second annular friction means of substantially the same size mounted concentrically to fit between said gearing and said housing operative to respectively engage said first and second disc means; a first annular fluid motor located concentrically between said gearing and said housing having a small area providing a small force for engaging said first friction means to provide a low torque; one of said members having a portion of small diameter compared to the diameter of said gearing and located next to said gearing; a second annular fluid motor located in said housing next to said gear unit and extending substantially between said small diameter portion of a member and said housing and having a large area to provide a high force for engaging said second friction means to provide a large torque.

2. In a transmission, a substantially cylindrical housing having a central axis; a drive member and driven member located coaxially on said axis in said housing; a planetary gear unit connecting said drive and driven members having first and second reaction elements operative respectively in response to braking to establish a first ratio requiring low reaction braking torque and a second ratio requiring high reaction braking torque; said gear unit having a substantially cylindrical coaxial envelope, first and second annular friction disc means connected respectively to said first and second reaction elements and located concentrically between said gear unit and said housing; first and second friction means mounted on said housing concentrically between said gear unit and said housing operative to respectively engage said first and second disc means; first annular fluid motor means located concentrically between said gear unit and said housing having a small area providing a small force for engaging said first friction means to provide a low reaction braking torque; one of said members having a portion of small diameter compared to the diameter of said gear unit, next to said gear unit; second annular fluid motor means located in said housing next to said gear unit and extending substantially between said small diameter portion of a member and said housing and having a large area to provide a large force for engaging said second friction means to provide a large reaction braking torque.

3. The invention defined in claim 2 and said annular disc means having discs of the same size.

4. In a transmission, a substantially cylindrical housing having a central axis; a drive member and driven member located coaxially on said axis in said housing; a planetary gear unit connecting said drive and driven members having first and second reaction elements operative respectively in response to braking to establish a first ratio requiring low reaction braking torque and a second ratio requiring high reaction braking torque; said gear unit having a substantially coaxial cylindrical envelope, first and second annular friction discs having the same external diameter connected respectively to said first and second reaction elements and located concentrically to fit between said gear unit and said housing; first and second friction means mounted on said housing concentrically between said gear unit and said housing operative to respectively engage said first and second discs; a first annular fluid motor located concentrically between said gear unit and said housing having a small area providing a small force for engaging said friction means to provide a small reaction braking torque; a first lever spring between said first friction means and motor providing a small mechanical advantage; one of said members having a portion of small diameter, compared to the diameter of said gear unit, next to said gear unit; a second annular fluid motor located in said housing next to said gear unit and extending substantially between said small diameter portion of a member and said housing and having a large area to provide a large force for engaging said second friction means to provide a large reaction braking torque and a second lever spring between said second friction means and motor providing a large mechanical advantage.

References Cited by the Examiner
UNITED STATES PATENTS

| | | | |
|---|---|---|---|
| 1,404,675 | 1/1922 | Wilson | 74—761 |
| 1,573,098 | 2/1926 | Small et al. | 74—761 |
| 2,251,625 | 8/1941 | Hale | 74—759 |
| 2,521,239 | 9/1950 | McDowall et al. | |
| 2,606,461 | 8/1952 | Herndon | 74—732 |
| 2,623,412 | 12/1952 | Hobbs et al. | 74—759 |
| 2,720,866 | 10/1955 | Maki et al. | |
| 2,825,245 | 3/1958 | Hobbs | 74—763 |
| 3,073,183 | 1/1963 | Kelley | 74—759 X |

DON A. WAITE, *Primary Examiner.*